US009179234B2

(12) United States Patent
Gorelik et al.

(10) Patent No.: US 9,179,234 B2
(45) Date of Patent: Nov. 3, 2015

(54) PROCESS FOR THE PRODUCTION OF A CAPACITOR MICROPHONE AND A CAPACITOR MICROPHONE

(71) Applicant: Sennheiser electronic GmbH & Co. KG, Wedemark (DE)

(72) Inventors: Vladimir Gorelik, Hannover (DE); Joerg Riechers, Wedemark (DE); Eckhard Welker, Wietze (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 0 days.

(21) Appl. No.: 14/068,610

(22) Filed: Oct. 31, 2013

(65) Prior Publication Data

US 2014/0133679 A1 May 15, 2014

(30) Foreign Application Priority Data

Oct. 31, 2012 (DE) ......................... 10 2012 219 915

(51) Int. Cl.
*H01G 7/00* (2006.01)
*H04R 31/00* (2006.01)
*H04R 19/01* (2006.01)

(52) U.S. Cl.
CPC ............ *H04R 31/006* (2013.01); *H04R 19/016* (2013.01); *Y10T 29/49005* (2015.01)

(58) Field of Classification Search
USPC .......... 29/25.42, 594, 602.1, 609.1, 876, 877; 381/174, 191, 361
See application file for complete search history.

(56) References Cited

U.S. PATENT DOCUMENTS

| | | | | |
|---|---|---|---|---|
| 4,701,640 | A | 10/1987 | Flygstad et al. | |
| 4,703,201 | A | 10/1987 | McGrail | |
| 6,031,922 | A | 2/2000 | Tibbetts | |
| 6,920,225 | B2 * | 7/2005 | Yonehara et al. | 381/174 |
| 7,223,136 | B2 * | 5/2007 | Yamamoto et al. | 439/876 |
| 8,019,101 | B2 * | 9/2011 | Gorelik et al. | 381/174 |
| 2003/0026443 | A1 * | 2/2003 | Yasuno et al. | 381/355 |
| 2005/0002538 | A1 * | 1/2005 | Yonehara et al. | 381/174 |
| 2006/0120544 | A1 * | 6/2006 | Akino | 381/174 |
| 2007/0242847 | A1 * | 10/2007 | Gorelik et al. | 381/355 |
| 2008/0063233 | A1 | 3/2008 | Gorelik | |
| 2011/0013788 | A1 * | 1/2011 | Izuchi et al. | 381/174 |

FOREIGN PATENT DOCUMENTS

| | | |
|---|---|---|
| DE | 69611983 | 9/2001 |
| DE | 102006042855 | 3/2008 |
| EP | 1762117 | 8/1985 |

* cited by examiner

*Primary Examiner* — Paul D Kim
(74) *Attorney, Agent, or Firm* — Frommer Lawrence & Haug LLP

(57) ABSTRACT

There is provided a process for assembly of a capacitor microphone. The capacitor microphone has a frame and a counterpart electrode. The counterpart electrode is positioned in the frame and held. Adhesive is applied so that the counterpart electrode is glued directly to the frame.

6 Claims, 3 Drawing Sheets

PROCESS FOR THE PRODUCTION OF A CAPACITOR MICROPHONE AND A CAPACITOR MICROPHONE

The present application claims priority from German Patent Application No. DE 10 2012 219 915.2 filed on Oct. 31, 2012, the disclosure of which is incorporated herein by reference in its entirety.

FIELD OF THE INVENTION

The present invention concerns a process for the production of a capacitor microphone and a capacitor microphone.

It is noted that citation or identification of any document in this application is not an admission that such document is available as prior art to the present invention.

Capacitor microphones or electret microphones typically have a microphone housing having a sound inlet opening, a diaphragm and a counterpart electrode which is associated with that diaphragm and which is arranged at a small spacing relative thereto. Capacitor microphones and in particular miniature capacitor microphones are typically produced using stacking technology. For that purpose the individual elements of the capacitor microphone (diaphragm with glued-on diaphragm, spacer ring, counterpart electrode) are stacked on each other in a microphone housing.

The following documents were searched in the German application from which priority is claimed: DE 10 2006 042 855 A1, DE 696 11 983 T2, U.S. Pat. No. 4,701,640 A and EP 1 762 117B1.

EP 1 762 117 B1 discloses a capacitor microphone having a microphone housing with a sound inlet opening, a diaphragm and a counterpart electrode which is associated with that diaphragm and which is arranged at a small spacing relative thereto. The microphone housing comprises two housing portions of which the second housing portion is of a larger diameter than the first and the second housing portion is arranged in the form of a cap or sleeve over the first housing portion. In that arrangement an edge of the diaphragm is folded over the edge of the first housing portion and fixed at the outside of the first housing portion.

It is noted that in this disclosure and particularly in the claims and/or paragraphs, terms such as “comprises”, “comprised”, “comprising” and the like can have the meaning attributed to it in U.S. Patent law; e.g., they can mean “includes”, “included”, “including”, and the like; and that terms such as “consisting essentially of” and “consists essentially of” have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

An object of the present invention is to provide a process for the production of a capacitor microphone and a capacitor microphone which can be assembled in automated fashion and which can be produced less expensively.

Thus there is provided process for assembling a capacitor microphone. The capacitor microphone has an electrically non-conducting frame, a counterpart electrode and a diaphragm. The counterpart electrode is positioned directly in the frame and held. Adhesive is applied so that the counterpart electrode is glued directly to the frame. The diaphragm is optionally directly fixed to the frame.

According to an aspect of the present invention the application of the adhesive is effected in an edge region of the counterpart electrode and/or beneath the counterpart electrode.

In a further aspect of the invention the counterpart electrode is only in contact with the adhesive at its underside or in the edge region and is radially at least partially surrounded by the frame.

The invention also concerns a capacitor microphone having an electrically non-conducting frame, a counterpart electrode optionally with an electret layer on the top side of the counterpart electrode and adhesive at an underside and/or in the edge region of the counterpart electrode so that the underside of the counterpart electrode rests only on adhesive or the edge region of the counterpart electrode is connected to the frame by the adhesive.

In an aspect of the invention the counterpart electrode is radially surrounded by the frame and the underside of the counterpart electrode is held by adhesive.

In an aspect of the present invention the electret layer extends at least partially beyond the edge region of the counterpart electrode so that in its outer edge the electret layer is provided or clamped between the housing and the counterpart electrode.

The invention concerns the notion that a counterpart electrode of the capacitor microphone is positioned and fixed in an electrically non-conducting frame, for example a plastic frame, so that the spacing between a face of the frame and the counterpart electrode is of a desired value. Optionally the diaphragm and the counterpart electrode can be fixed directly to the non-conducting frame. That value must correspond to the air gap between the fitted diaphragm and the counterpart electrode. That can already provide a measurable and operable transducer.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
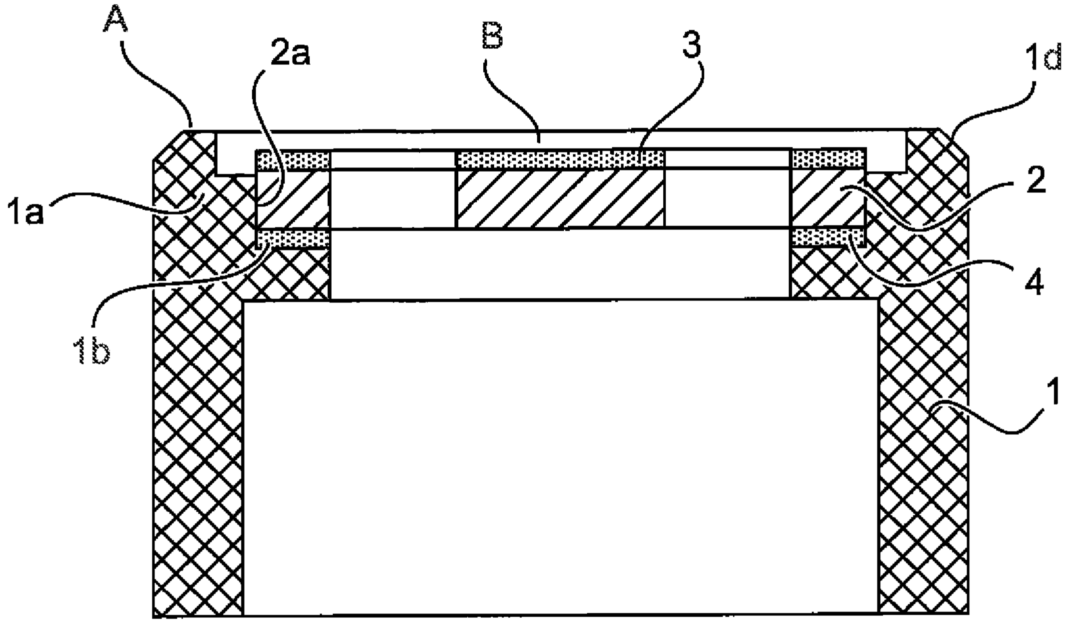
FIG. 1 shows a diagrammatic cross-section of a capacitor microphone according to a first embodiment.

FIG. 1 shows a diagrammatic cross-section of a capacitor microphone according to a first embodiment. The capacitor microphone has a frame 1 and a counterpart electrode 2 with an edge region 2*a* and an electret layer 3. The frame 1 can be in the form of an electrically non-conducting frame, for example a plastic frame or a plastic sleeve. Inwardly the frame 1 can have a first step 1*a* and a second step 1*b*. The frame 1 further has an end face A for receiving an electrically conductively coated diaphragm. According to the invention the diaphragm 5 is preferably electrically conductively coated on both sides. The counterpart electrode 2 can be glued at its periphery on the second step 1*b* by means of a glue or adhesive 4. The top side 3 of the counterpart electrode 2 has an electret surface B. The spacing between the end face A and the electret surface B is of a value corresponding to the air gap between the counterpart electrode and a diaphragm mounted to the end face A.

According to the invention the counterpart electrode 2 is introduced into an end of the frame 1 and is held on a position so that there is a gap between the underside of the counterpart electrode and the second step 1*b*. A glue or adhesive 4 can be applied or introduced into that gap. Due to positioning and holding of the counterpart electrode 2 before the adhesive is applied or introduced into the gap between the counterpart electrode and the second step 1*b* the spacing between the top side of the counterpart electrode with the electret layer 3 and the end face A of the frame, on winch the diaphragm is fitted can be adjusted. According to the invention the counterpart electrode 2 is glued directly on the frame 1 (here the second step 1*b*). The adhesive can peripherally form a closed contour along the entire edge of the counterpart electrode 2 or can be applied only at individual portions of the edge.

According to the invention there is no element (like for example a spacer ring) which establishes the spacing between the counterpart electrode 2 and the diaphragm of the electroacoustic transducer. Rather, the spacing between the top side of the counterpart electrode 2 and the diaphragm is achieved by suitable positioning of the counterpart electrode and then glueing of the counterpart electrode directly to the frame 1. In that way the spacing between the top side of the counterpart electrode with the electret layer 3 and the diaphragm can be adjusted according to the invention without various spacer rings having to be provided for that purpose.

In other words, the air gap between the diaphragm and the counterpart electrode is not defined by the configuration of the plastic frame and in particular the first and second steps 1*a*, 1*b* as well as the thickness of the counterpart electrode, but in the final effect is established only by the adhesive.

In the region of the end face A of the frame 1 the outside can respectively have a bevelled surface 1*d*.

The diaphragm 5 and/or the counterpart electrode 2 can optionally be fixed directly to the electrically non-conducting frame.

Figure 2:
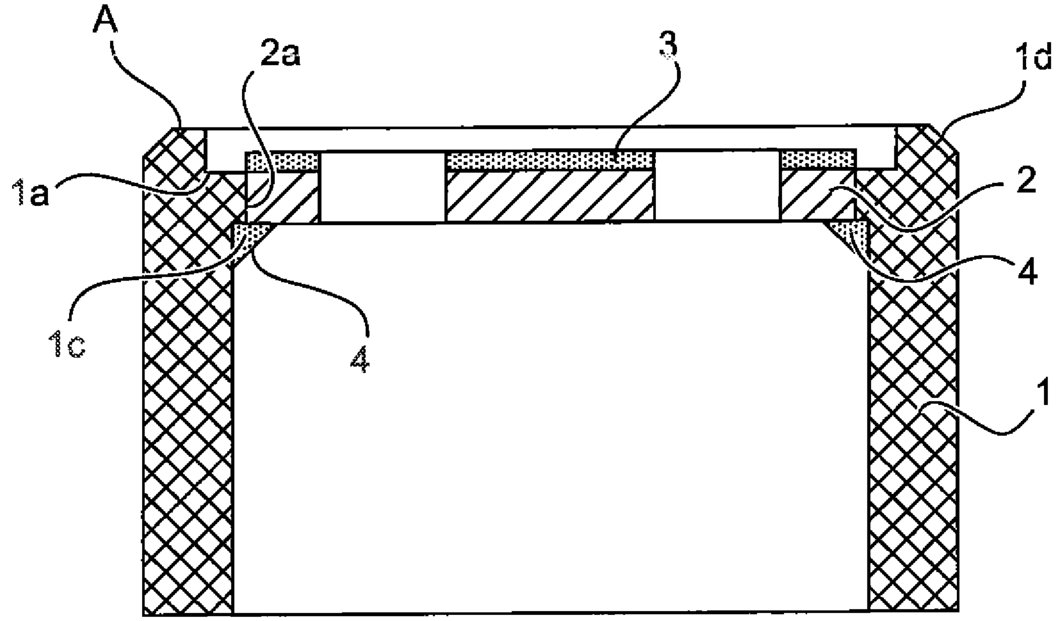
FIG. 2 shows a diagrammatic cross-section of a capacitor microphone according to a second embodiment.

FIG. 2 shows a diagrammatic sectional view of a capacitor microphone according to a second embodiment. The capacitor microphone has an electrically non-conducting frame, for example a plastic frame 1 with a first step 1*a* inwardly and a counterpart electrode 2 with an edge region 2*a* and an electret layer 3.

The counterpart electrode 2 can be fixed by means of adhesive 4 to the frame (in particular between the first step 1*a*). In the second embodiment the adhesive 4 used for fixing purposes is provided only in the edge region 1*c* of the frame 1 below the step 1*a* so that the counterpart electrode 2 is glued directly to the frame 1. In the region of the end face A of the frame the outside can have a respective bevelled surface 1*d*.

According to the invention the counterpart electrode 2 is introduced into the frame 1 and appropriately positioned. In the second embodiment the electrode 2 can be so positioned that the underside of the counterpart electrode 2 terminates with the edge region 1*c* of the frame 1. Then an adhesive 4 can be provided for fixing purposes, wherein the adhesive is provided in the edge region 1*c* in such a way that the adhesive 4 is in contact with an outer region of the underside of the counterpart electrode 2. As in the first embodiment the spacing between the top side of the counterpart electrode 2 and the diaphragm (or the end face A of the frame) can be adjusted by suitable positioning of the counterpart electrode in the frame and then glueing, without a spacer ring having to be used for that purpose. In the second embodiment the counterpart electrode 2 is glued directly to or on the frame 1 or a portion thereof.

Figure 3:
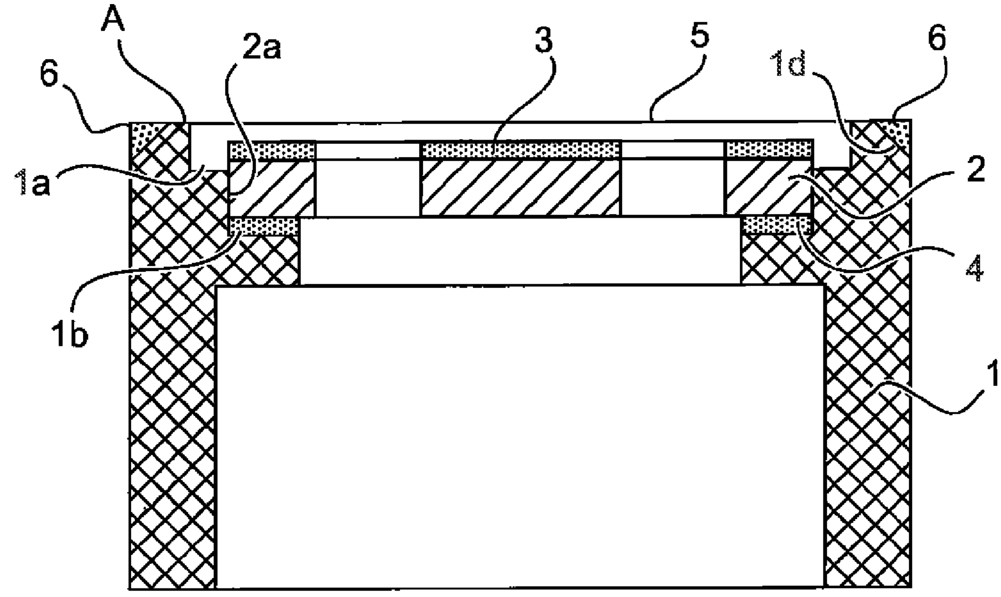
FIG. 3 shows a diagrammatic cross-section of a capacitor microphone according to a third embodiment.

FIG. 3 shows a diagrammatic sectional view of a capacitor microphone according to a third embodiment. The capacitor microphone has a frame 1 with a first and a second step 1*a* and 1*b* inwardly and a counterpart electrode 2 having an edge region 2*a* and an electret layer 3. In the region of the end face A of the frame 1 the outside can have a respective bevelled surface 1*d*.

The diaphragm 5 is optionally fixed directly on the end face A of the frame. In that case at its outside the diaphragm is glued in the region of the bevelled surface 1*d* by means of an adhesive 6. It is possible in that way to achieve a maximum active diaphragm area as only that narrow region of the diaphragm, that is in contact with the adhesive 6, does not vibrate.

Figure 4:
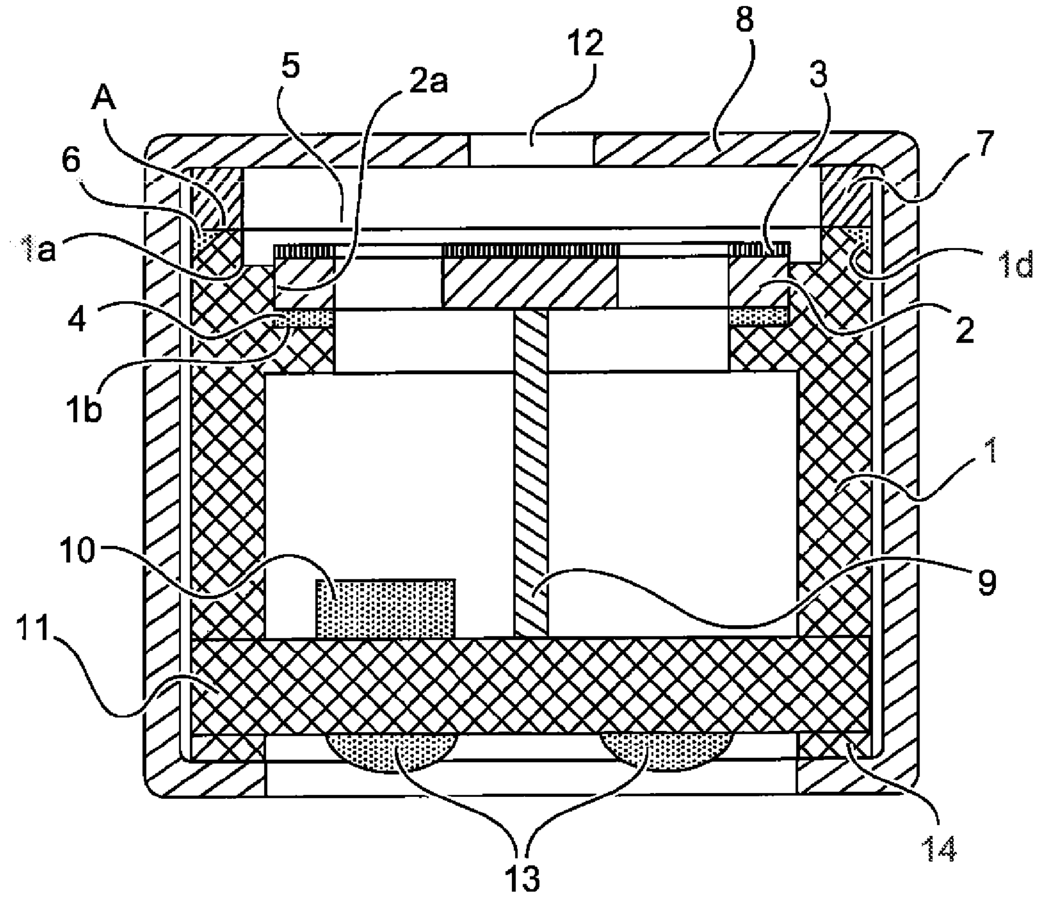
FIG. 4 shows a diagrammatic cross-section of a capacitor microphone according to a fourth embodiment.

FIG. 4 shows a diagrammatic sectional view of a capacitor microphone according to a fourth embodiment. The capacitor microphone has a frame 1 with a first and a second step 1*a*, 1*b* and a counterpart electrode 2 which is fixed on the second step by means of an adhesive 6. The microphone further has a diaphragm 5 which is fixed on the end face A of the frame 1 by means of an adhesive 6. A contact ring 7 can optionally be provided on the diaphragm 5.

The microphone further has an electrically conducting capsule housing 8 (with a sound inlet 12) which surrounds the frame 1. The microphone further has a circuit board 11 with electronic components 10 and connections 13. The counterpart electrode 2 is connected to the circuit board 11 by way of a connecting element 9. A conductor track 14 at the underside of the circuit board 11 serves as a ground contact with the capsule housing 8.

The third and fourth embodiments are based on the first embodiment. Accordingly the foregoing description correspondingly applies to the third and fourth embodiments.

According to the invention a contact ring 7 can optionally be omitted. In that case the diaphragm is not directly cut off at the glueing location 6 but is cut off at a radial spacing of about half the height of the transducer assembly. When the structural assembly is introduced into the housing 8 the excess piece of diaphragm is laid over at the air gap between the transducer assembly and the housing. In that case the outer metallisation layer contacts the diaphragm with the housing. In that case the transducer assembly can be fixed to the housing for example by glueing.

In the region of the end face A of the frame 1 the outside of the frame 1 can have a respective bevelled surface 1*d.*

Figure 5:
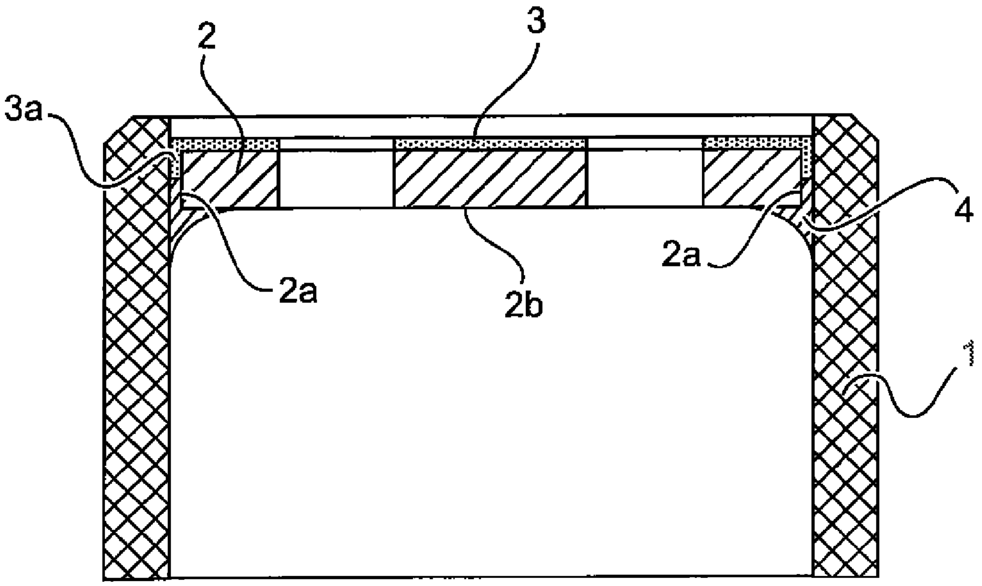
FIG. 5 shows a diagrammatic cross-section of a capacitor microphone according to a fifth embodiment.

FIG. 5 shows a diagrammatic cross-section of a capacitor microphone according to a fifth embodiment. The capacitor microphone of the fifth embodiment can be based on one of the preceding embodiments. In the fifth embodiment the electrically non-conducting frame 1 is provided, without stepping (as in FIG. 1 or FIG. 2). In addition the electret layer 3 has an edge region or outer portion 3*a* which extends beyond the edge region 2*a* of the counterpart electrode 2 and is thus clamped between the frame 1 and the edge region 2*a* of the counterpart electrode 2. Accordingly the edge region 3*a* of the electret layer 3 is provided between the non-conducting frame 1 and the counterpart electrode 2. An adhesive 4 is optionally provided between the edge region 2*a* of the counterpart electrode 2 and the frame 1. In addition the adhesive 4 is provided at the underside 2*b* of the counterpart electrode and in particular in the edge region 2*a*. As according to the invention no spacer ring has to be provided above the counterpart electrode 2 the electret layer 3 could be detached from the counterpart electrode in the edge region thereof. That can be effectively prevented by the laid-over outer portion 3*a* of the electret layer.

Figure 6:
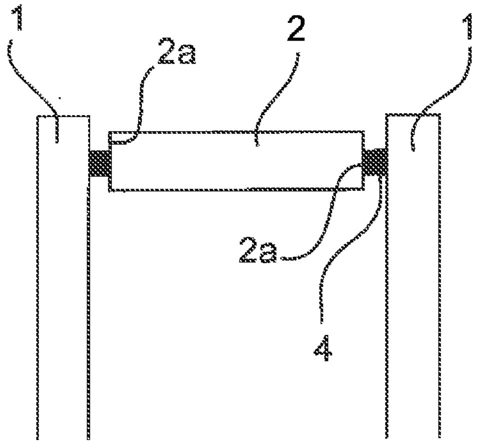
FIG. 6 shows a diagrammatic cross-section of a capacitor microphone according to a sixth embodiment.

FIG. 6 shows a diagrammatic cross-section of a capacitor microphone according to a sixth embodiment. In this case the capacitor microphone of the sixth embodiment can be based on a capacitor microphone according to the first, second, third, fourth or fifth embodiment. In the sixth embodiment the counterpart electrode 2 is connected at its edge region 2*a* to the frame 1 by adhesive 4. According to the sixth embodiment therefore no adhesive is provided beneath the counterpart electrode 2.

Figure 7:
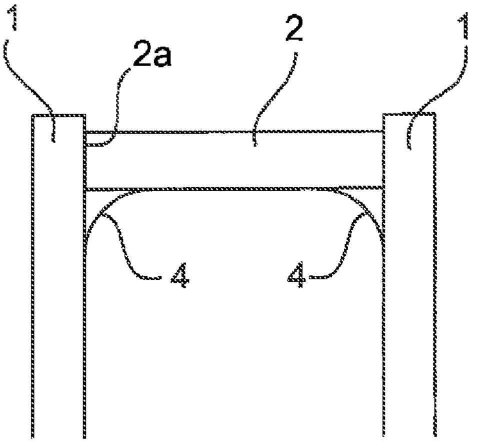
FIG. 7 shows a diagrammatic cross-section of a capacitor microphone according to a seventh embodiment.

FIG. 7 shows a diagrammatic cross-sectional view of a capacitor microphone according to the seventh embodiment. The capacitor microphone of the seventh embodiment can be based on a capacitor microphone according to one of the preceding embodiments. In the seventh embodiment the edge region 2*a* of the counterpart electrode 2 bears directly on the frame 1 and the counterpart electrode 2 is held in position at its underside and at its periphery by adhesive 4.

According to the invention the counterpart electrode 2 is glued or held to the frame 1 by way of adhesive 4. In that arrangement the adhesive can be provided between the counterpart electrode 2 and the frame 1, beneath the counterpart electrode 2 and/or above the counterpart electrode 2.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A process for assembling a capacitor microphone, wherein the capacitor microphone has an electrically non-conducting frame, a counterpart electrode, and a diaphragm, comprising the steps:

positioning and holding the counterpart electrode directly in the frame;

applying an adhesive so that the counterpart electrode is glued directly to the frame; and fixing the diaphragm directly to the frame;

wherein an electret layer is arranged on a top side of the counterpart electrode;

wherein the electret layer projects on the top side of the counterpart electrode radially at least partially beyond the counterpart electrode so that a part of the electret layer is clamped between the frame and an edge region of the counterpart electrode.

2. The process as set forth in claim 1;

wherein the application of the adhesive is effected in an edge region of the counterpart electrode.

3. The process as set forth in claim 1;

wherein the counterpart electrode is only in contact with the adhesive at a top side or an underside of the counterpart electrode; and wherein the counterpart electrode is radially at least partially surrounded by the frame.

4. The process as set forth in claim 1;

wherein the application of the adhesive is effected beneath the counterpart electrode.

5. A capacitor microphone comprising:

a frame;

a counterpart electrode having an edge region; and adhesive arranged at an underside and/or in an edge region of the counterpart electrode so that the underside of the counterpart electrode rests only on adhesive or the edge region of the counterpart electrode is connected to the frame by the adhesive;

wherein an electret layer is arranged on a top side of the counterpart electrode;

wherein the electret layer projects on the top side of the counterpart electrode radially at least partially beyond the counterpart electrode so that a part of the electret layer is clamped between the frame and an edge region of the counterpart electrode.

6. The capacitor microphone as set forth in claim 5;

wherein the counterpart electrode is radially surrounded by the frame and the underside of the counterpart electrode is held by the adhesive.

* * * * *